United States Patent Office 3,161,662
Patented Dec. 15, 1964

3,161,662
11β-HYDROXYL-16α-METHYL STEROIDS AND 14α-HYDROXYL-16α-METHYL STEROIDS
Klaus Kiesslich and Gerhard Raspe, both of Berlin-Charlottenburg, Germany, assignors to Schering A.G., Berlin, Germany
No Drawing. Filed May 8, 1961, Ser. No. 108,260
Claims priority, application Germany, May 13, 1960, Sch 27,885; Sept. 9, 1960, Sch 28,457; Feb. 3, 1961, Sch 29,168
5 Claims. (Cl. 260—397.45)

The present invention relates to a method of producing 11β-hydroxy-16α-methyl steroids and to a method of producing 14α-hydroxy-16α-methyl steroids as well as to the production of new 11β-hydroxy and 14α-hydroxy-16α-methyl steroids.

16α-methyl steroids which at the same time have an oxygen-function on the 11-carbon atom are known to exhibit valuable pharmacological properties. Thus, for example, 16α-methyl-9α-fluor-1,4-pregnadiene-11β,17α-21-triol-3,20-dione (Dexamethasone) has found extensive application due to its antiphlogistic, glucocorticoid and anti-allergic properties.

Among others the following 16α-methyl steroids of the pregnane series are known to have similar actions:

16α-methyl-4-pregnene-11β,17α,21-triol-3,20-dione (16α-methyl-hydrocortisone)
6α-methyl-4-pregnene-17α,21 - diol - 3,11,20 - trione (16α-methylcortisone)
16α-methyl-1,4-pregnadiene-11β,17α,21-triol - 3,20 - dione (16α-methyl-prednisolone)
16α-methyl-9α-fluor-4-pregnene - 11β,17α,21 - triol - 3,20-dione (16α-methyl-fluorohydrocortisone).

In the synthesis of the above named compounds or related 16α-methyl steroids the introduction of the 11-oxygen-function constitutes a particularly important reaction step. The introduction thereof is best carried out by means of microorganisms which produce oxygenating ferments (hydroxylases).

In the biological introduction of the 11-oxygen-function (either as a 11β- or 11α-oriented hydroxyl group) in general side products with hydroxyl groups in other positions in the molecule are formed and the yield of the desired product is relatively low.

It is accordingly a primary object of the present invention to provide a method of producing 11β-hydroxylated 16α-methyl steroids in relatively high yield.

It is another object of the present invention to provide a method of producing new 11β-hydroxylated 16α-methyl steroids.

It is yet another object of the present invention to provide for the production of new 14α-hydroxylated 16α-methyl steroids and to provide for methods of producing these 14α-hydroxyl-16α-methyl steroids.

The 11β-hydroxylated 16α-methyl steroids of the present invention have antiphlogistic, glucocorticoid and anti-allergic properties but they do not exhibit mineralo-corticoid or catabolic side effects, which make these compounds extremely useful. In addition, these compounds can serve as intermediates in the snythesis of other valuable steroids, for example by acetylating any free hydroxyl group, by saturating any double bond, etc.

The 14α-hydroxylated 16α-methyl steroids of the present invention also have useful properties as anti-phlogistic agents but not possessing typical corticoid activity. In addition, these 14α-hydroxylated 16α-methyl steroids may serve as useful intermediates in the production of many useful steroids, for example by saturating any unsaturated double bonds in known manner, by acetlylating or etherifying free hydroxyl groups, also in known manner, etc.

It is accordingly a further object of the present invention to provide new and useful steroid compounds.

Other objects and advantages of the present invention will be apparent from a further reading of the specification and of the appended claims.

With the above and other objects in view, the present invention mainly comprises with respect to the production of 11β-hydroxylated 16α-methyl steroids the subjecting of a 16α-methyl steroid of the pregnane series to the action of a fungus strain which if used for 11β-hydroxylation of a 16α-methyl-free steroid is known to form a side product with an α-oriented hydroxyl group in the D ring of the steroid, thereby forming the corresponding 11β-hydroxylated -16α-methyl steroid in high yield.

The preferred microrganism for the production of the 11β-hydroxylated-16α-methyl steroids of the present invention are the fungi of the Curvularia strain, and particularly of the strain and species Curvularia lunata, as well as the enzymes thereof.

In addition to being generally applicable to the production of 11β-hydroxylated-16α-methyl steroids the method of the present invention is also adapted to the production of new 11β-hydroxylated-16α-methyl steroids of the following general formula:

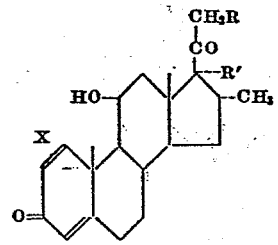

wherein R' is selected from the group consisting of hydrogen and hydroxyl, wherein when R' is hydrogen then R is selected from the group consisting of hydrogen, hydroxyl, alkoxy wherein the alkyl is a lower alkyl, and acyloxy wherein the acyl is derived from a lower aliphatic carboxylic acid, and when R' is hydroxyl then R is hydrogen, and wherein when R is hydrogen then X is selected from the group consisting of a single and a double bond, and when R is hydroxyl then X is a single bond.

Among the particularly suitable starting materials of the method of the present invention are 16α-methyl-4-pregnene-17α,21-diol - 3,20 - dione (16α - methyl - Reichstein-S) giving over 80% yield of 16α-methyl-4-pregnene-11β,17α,21-triol-3,20-dione (16α-methyl-hydrocortisone).

Among the new compounds produced according to the method of the present invention are 16α-methyl-corticosterone, and 16α-methyl-11β,17α-oxyprogesterone.

Although the present invention is not meant to be limited as to any theory of operation, such theory is herewith given in the hopes that it will help others to better understand the invention. It appears that the 16α-methyl group makes it difficult for the oxygenation of the ferment to take place on the backside of the D ring of the steroid molecule, or entirely prevents it, and as a result the reaction is forced to proceed in a simple manner to form the 11β-hydroxylated compound.

In addition to the production of 11β-hydroxyl-16α-methyl steroids the present invention also comprises the production of 14α-hydroxyl-16α-methyl steroids. These 14α-hydroxylated 16α-methyl steroids are obtained in lesser yield as side products in the production of 11β-hydroxylated 16α-methyl steroids, and the new 14α-hydroxylated 16α-methyl steroids of the present invention are in and of themselves extremely valuable compounds, as well as being very useful intermediate compounds in steroid synthesis.

The new 14α-hydroxylated compounds of the present invention are of the following general formula:

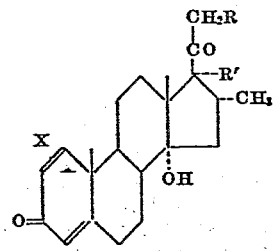

wherein R' is selected from the group consisting of hydrogen and hydroxyl; wherein R is selected from the group consisting of hydrogen, hydroxyl, alkoxy wherein the alkyl is a lower alkyl, and acyloxy wherein the acyl is derived from a lower aliphatic carboxylic acid, and wherein when R is hydrogen then X is selected from the group consisting of a single and a double bond, and when R is hydroxyl then X is a single bond.

The new compounds of the present invention include Δ$^{1,4}$-pregnadiene compounds with a 17α-hydroxyl group of the following general formula:

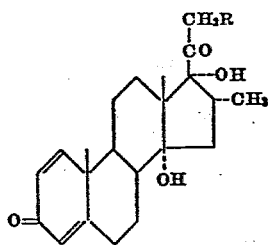

wherein R has the same definition as above, as well as Δ$^4$-pregnene compounds with the 17α-hydroxyl group, of the following general formula:

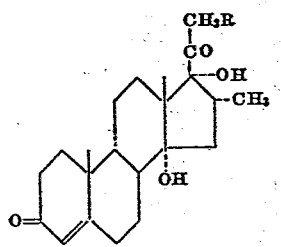

wherein R has the same definition as above.

The compounds of the present invention also include Δ$^{1,4}$-pregnadiene compounds which do not contain a hydroxyl group in the 17-position, i.e. compounds of the following general formula:

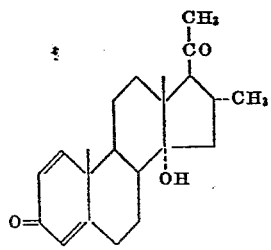

as well as Δ$^4$-pregnene compounds without any hydroxyl group in the 17-position, that is compounds of the following general formula:

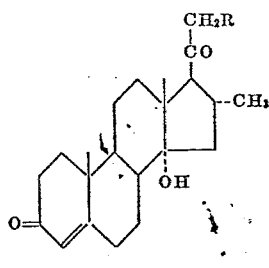

wherein R has the same definition as above.

The method of producing the 14α-hydroxylated-16α-methyl steroids of the present invention mainly comprises the subjecting of a compound of the formula:

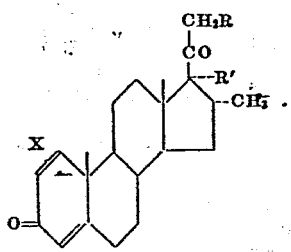

wherein R is selected from the group consisting of hydrogen and hydroxyl, wherein R' is selected from the group consisting of hydrogen and hydroxyl, and wherein when R is hydrogen then X is selected from the group consisting of a single and double bond and when R is hydroxyl then X is a single bond, to the action of a microorganism selected from the group consisting of microorganisms of the Curvularia strain and microorganisms of the Heliocostylum strain so as to form the corresponding 14α-hydroxy compound, and recovering said 14α-hydroxy compound.

The resulting 14α-hydroxy compound can be purified in per se known manner for example by chromatography on suitable adsorption agents such as silica-gel.

In the case where R is hydroxyl and it is desired to obtain a 21-position acylated compound, the hydroxyl in the 21-position can be acylated in known manner. In the case where the carbon-carbon bond in the 1,2-position is saturated, and it is desired to produce a Δ$^{1,4}$-pregnadiene compound, the 1,2-position can be dehydrogenated in known manner, for example by the action of a suitable microorganism such as *Bacillus lentus*.

In order to produce the 14α-hydroxyl-16α-methyl steroids without any 17-position hydroxyl group, i.e. compounds of the following general formula:

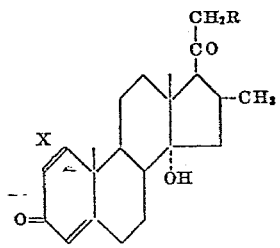

wherein R and X have the same definitions as above, the starting compound should be free of any hydroxyl group in the 17-position, i.e. a compound of the following general formula:

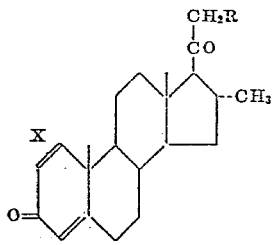

wherein R and X have the same definitions as above.

Similarly, if it is desired to produce a compound with a 17α-hydroxyl group, i.e. a compound of the following general formula:

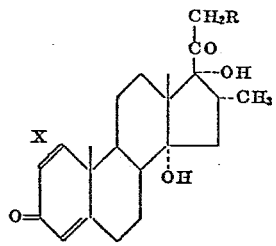

then the starting compound should contain the 17α-hydroxyl group, i.e. a compound of the following general formula:

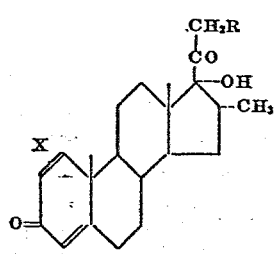

R and X having the same definitions as above in both cases.

As indicated above it is possible to produce compounds wherein the 1,2-carbon atoms are unsaturated, i.e. a double bond therebetween, by first forming the 14α-hydroxy-16α-methyl steroid starting from a compound which is saturated at the 1,2-carbon atoms and then introducing the Δ¹-double-bond for example by means of a suitable microorganism such as *Bacillus lentus*. It is also possible to carry out the fermentation process of the present invention starting with an 11- and 14-oxygen-free 16α-methyl steroid which is already unsaturated in Δ¹-position, i.e. between the 1 and 2 carbon atoms.

Reaction products wherein R is an acyloxy group, particularly the acetoxy group, are generally not suitably produced by starting from the corresponding 11- and 14-oxygen-free 16α-methyl steroid by direct means, since the 21-acyloxy group during the fermentation in which the 11-oxygen or 14-oxygen function is introduced into the molecule is saponified. It is therefore generally necessary when it is desired to produce the 21-acylated final product to start with the primary hydroxylated product and then to acylate the 21-position hydroxyl group. As a matter of fact, if the 21-position acylated compound is used as a starting compound then the final product will probably contain a 21-position hydroxyl group which then must be acylated if a 21-acyl product is desired as the final compound.

Although, as stated above, the 14α-hydroxylated-16α-methyl steroids can be produced by the action of the same microorganisms which are used to produce the 11β- hydroxylated products, that is for example by the reaction of microorganisms of the strain of the species *Curvularia lunata*, a still greater yield of the desired 14α-hydroxylated product can be obtained by the use of microorganisms of the strain *Heliocostylum piriforme*.

The separation of the 11β-hydroxylated product and the 14α-hydroxylated product from each other and from the culture liquor can be achieved by fractional crystallization and the further purification of the hydroxy steroids precipitated in the mother liquor can be accomplished by per se known methods, for example by chromatography. A convenient method of purification is through the production of the 21-acyl derivative.

The new 14α-hydroxylated-16α-methyl steroids of the present invention are technically very valuable since they possess a strong inflammation arresting action which even surpasses that of hydrocortisone. The particular value of the 14α-hydroxyl compounds of the present invention lies in the fact that the undesirable but typical side effect of corticoids which occurs in the treatment of inflammatory processes, such as action on the glucose addition in the liver and on the mineral metabolism, either does not occur at all with the compounds of the present invention or only occurs in the case of unusually high dosages. Thus, these compounds provide a new class of particularly valuable new acting antiphlogistics.

The structural characteristic giving rise to the specific action of the new antiphlogistics with the 14-position hydroxyl group appears to depend on the simultaneous presence of a 16α-methyl group and a 14α-hydroxyl group, since the isolated presence of a 16α-methyl group alone or of a 14α-hydroxyl group alone, which were expressly produced for comparative purposes, indicated that such compounds did not have any similar activity. Prior to the present invention it was thought that the main structural characteristic of antiphlogistics required an oxygen-function at the 11-carbon atom, which compounds however at the same time had the main structural characteristic at typical corticoid action which in the treatment for inflammatory processes is undesirable. Accordingly, the discovery that the new 14α-hydroxyl-16α-methyl steroids of the present invention possess these valuable properties is of great importance to those skilled in the art.

The following table sets forth a comparison of reaction of hydrocortisone and 16α-methyl-4-pregnene-14α,17α,21-triol-3,20-dione (16α-methyl-14α-hydroxy-Reichstein-S).

TABLE 1

| Substance | Inflammation retardation (Threshold Dose), mg. | Glycogen Test (Threshold Test), mg. | Q |
|---|---|---|---|
| Hydrocortisone | 0.1 | 0.028 | 3.6 |
| 16α-Methyl-14α-hydroxy-Reichstein S | 0.04 | about 1 | 0.04 |

Q stands for the quotient of the inflammation retardation and glycogen action.

In the case of 16α-methyl-14α-hydroxy-Reichstein S the value for Q is approximately 100 times better than in the case of hydrocortisone. The finding clearly shows that the presence of an 11β-position hydroxyl group is not essential for the condition of arriving at an antiphlogistic action, but that with respect to achieving only an antiphlogistic action better results can be achieved by the simultaneous presence of a 16α-methyl group and a 14α-hydroxyl group. However, this still left unexplained the role of the 17α-hydroxyl group with respect to producing an antiphlogistic effect as well as with respect to the suppression of the typical corticoid effect.

In further pursuit of this question compounds without a 17α-hydroxyl group were produced, i.e. compounds of the following general formula:

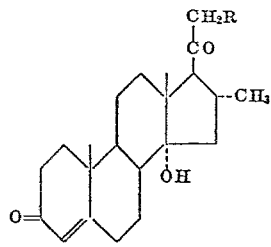

wherein R has the same definition as above, that is compounds containing a 14α-hydroxyl group but not containing a 17α-hydroxyl group, and also compounds without the Δ¹-double bond, and it was found that such compounds exhibited the same, if not stronger, anti-inflammation action as the above mentioned tested 14α-hydroxylated-16α-methyl steroids.

Thus, for example, the compound 16α-methyl-4-pregnene-14α,21-diol-3,20-dione, even in the form of its 21-acetate, exhibits three times the inflammation retarding action of the free 16α-methyl-4-pregnene-14α,17α,21-triol-3,20-dione, although the esterification of the 21-position hydroxyl according to previous experiences is supposed to weaken this particular action.

The new 17α-hydroxyl-free 16α-methyl-14α-hydroxy steroids are produced from the corresponding 14α- and 17α-hydroxyl-free compounds by hydroxylation with a microorganism of the species *Curvularia lunata* or *Heliocostylum piriforme* in completely analogous manner to the production of the previously mentioned 16α-methyl-14α,17α-diols. In addition, these compounds can be obtained by elimination of the 17α-hydroxyl group from the last mentioned diols, for example by treatment with zinc dust in dilute acetic acid.

The following examples are given to further illustrate the present invention. The scope of the invention is not, however, meant to be limited to the specific details of the examples.

Example 1

The following procedure may be used for carrying out 11β-hydroxylation:

A 50 liter capacity stainless steel fermenter, free of rust, is charged with 30 liters of a nutrient solution containing:

| | Percent |
|---|---|
| Glucose | 4.4 |
| Sodium nitrate | 0.3 |
| Potassium hydrogen phosphate | 0.1 |
| Magnesium sulfate | 0.05 |
| Ferrous sulfate | 0.002 |
| Cornsteep liquor (adjusted to pH 7 with sodium hydroxide) | 0.5 |

By heating for one half hour at 120° C. it is sterilized and after cooling it is inoculated with a mycelium suspension of a strain of *Curvularia lunata*. The mycelium suspension is obtained by rinsing a 7-day culture developed at 28° C. of the fungus on 15 g. of wet maize (inoculated from a biomalt inclined agar agar culture) with 100 cc. of physiological saline solution.

After 2 hours of propagation at 25° C. under stirring (220 revolutions per minute) and airing (1650 liters per hour) 1.8 liters of the resulting culture is taken off under sterile conditions and transferred into a fermenter with 28.2 liters of a nutrient solution containing:

| | Percent |
|---|---|
| Glucose | 4.4 |
| Malt extract | 1 |
| Sodium nitrite | 0.3 |
| Potassium dihydrogen phosphate | 0.1 |

After 24 hours of cultivation 7.5 g. of the steroid to be hydroxylated is introduced into 200 cc. of ethanol and fermented under the same conditions. The fermentation time varies depending upon the particular steroids, as will be more apparent from the examples.

The course of the fermentation is followed by removing samples which are extracted with methylisobutyl ketone. The extract is analyzed by paper chromatography. The system used is dioxane+toluene/propylene glycol.

After completion of the fermentation the culture broth is filtered off under suction on a Buchner funnel and extracted three times, each time with 10 liters of methyl isobutyl ketone. The purified extracts are concentrated in a vacuum circulating evaporator and then evaporated to dryness under vacuum and under nitrogen. The residue is subjected to chromatography on silica gel (10% water addition).

The following table gives a summary of the results of several 11β-hydroxylations carried out in the above-described manner:

TABLE 2

| Starting substance | Resulting Product | Fermentation Time, hours | Yield, percent |
|---|---|---|---|
| 1. 16α-methyl-4-pregnene-3,20-dione. | 16α-methyl-4-pregnene-11β-ol-3,20-dione. | 34 | 30 |
| 2. 16α-methyl-4-pregnene-17α-ol-3,20-dione. | 16α-methyl-4-pregnene-11β,17α-diol-3,20-dione. | 32 | 32 |
| 3. 16α-methyl-4-pregnene-21-ol-3,20-dione. | 16α-methyl-4-pregnene-11β,21-diol-3,20-dione. | 28 | 60 |
| 4. 16α-methyl-4-pregnene-17α,21-diol-3,20-dione. | 16α-methyl-4-pregnene-11β,17α,21-triol-3,20-dione. | 28 | 81 |

TABLE 3

| Eluation Agent | Solvent for Recrystallization | M.P., °C. | λ_max. | ε |
|---|---|---|---|---|
| 1. Chloroform: ethyl acetate (3:1). | Methylene chloride/isopropyl ether. | 202–204 | 240 | 14,350 |
| 2. Chloroform: ethyl acetate (3:1). | Methylene chloride/hexane. | 197–198 | 241 | 15,550 |
| 3. Chloroform: ethyl acetate (3:1). | Methylene chloride | {146–147 Acetate: 193.5–194 | 240 240 | 14,300 15,600 |
| 4. Chloroform | Ethylene chloride | 206–208 | 241 | 15,700 |

Example 2

A fermenter of stainless steel with a 50 liter capacity is charged with 30 liters of a nutrient medium containing:

| | Percent |
|---|---|
| Saccharose | 5 |
| Beet sugar molasses | 1 |
| NaNO₃ | 0.2 |
| KH₂PO₄ | 0.1 |
| KCl | 0.05 |
| MgSO₄ | 0.05 |
| FeSO₄ | 0.001 |
| Cornsteep (pH 7) | 0.5 |

It is sterilized by heating for one half hour at 120° C. and after cooling it is inoculated with a spore suspension of *Curvularia lunata*, which is obtained by rinsing a 7-day maize culture (15 g. maize) with approximately 100 cc. of physiological saline solution.

After 2 days of propagation at 25° C. under stirring (220 revolutions per minute) and airing (1.65 cubic meters per hour) 28 liters of the resulting culture are removed under sterile conditions and transferred into a 730 liter fermenter containing 470 liters of a nutrient medium containing 5% saccharose, 1% beet sugar molasses, 0.2% sodium nitrate and 0.1% of potassium dihydrogen phosphate. After 24 hours of culturing under stirring (110 revolutions per minute) and airing (8 cubic meters per hour) 125 g. of 16α-methyl-Reichstein-S in 3.3 liters of ethanol are added and fermented for 28 hours under the same conditions.

The course of the fermentation is determined by removal of samples which are extracted with methyl isobutyl ketone. The extracts are analyzed by paper chromatography in a system of dioxane+toluene/propylene glycol.

After the end of the fermentation the culture broth is filtered off under suction on a rotating filter and extracted with methyl isobutyl ketone. The extract is evaporated under vacuum and the residue is recrystallized twice from ethyl acetate. There is thus obtained 16α-methyl-hydrocortisone having a melting point of 210/211–213° C.

The mother liquor is evaporated and subjected to chromatography on silica gel (10% water addition). 12 g. of the oily crystalline substance are eluated with chloroform/ethyl acetate (4:1), which after recrystallization from ethyl acetate results in 6.5 g. of pure 16α-methyl-4-pregnene-14α,17α,21-triol-3,20-dione having a melting point of 222/223–224° C. The yield corresponds to 5% of the theoretical. The ultra violet extinction amounts to $\epsilon_{240} = 16{,}010$.

Example 3

760 mg. of 16α-methyl-4-pregnene-14α,17α,21-triol-3,20-dione is permitted to stand in 6 cc. dry pyridine and 3 cc. of acetanhydride for 3 hours at room temperature and the reaction mixture is then stirred into 100 cc. of 10% sulfuric acid at 0° C. After 1 hour the crystalline precipitated product is filtered off under suction, washed with water, dried and after recrystallization from ethyl acetate gives 16α-methyl-4-pregnene-14α,17α,21-triol-3,20-dione-21-acetate having a melting point of 215/216.5–218° C. and an ultra violet extinction of $\epsilon_{240} = 16{,}500$.

The yield amounting to 680 mg. = 80% of the theoretical.

Example 4

A 50 liter stainless steel fermenter is charged with 30 liters of a nutrient medium containing 1% yeast extract, 5% cornsteep liquor and 2% glucose (pH 7) and sterilized as described in Example 2. It is inoculated with a bacteria suspension of *Bacillus lentus*, which is obtained by rinsing a bouillon agar surface of 65 cm.² with 7 cc. of physiological saline solution.

After 24 hours of propagation under the conditions described in Example 2 1.8 liters of the resulting culture are removed under sterile conditions and transferred into a fermenter containing 28.2 liters of the same medium. At the same time there is added a solution of 5 g. of 16α-methyl-4-pregnene-14α,17α21-triol-3,20-dione in 150 cc. of ethanol and fermented under the same conditions for 16 hours at 25° C.

The course of the fermentation is determined by removal of samples which are extracted with methyl isobutyl ketone. The extracts are analyzed polarographically.

The culture broth is stirred three times, each time with 10 cc. of methyl isobutyl ketone and the purified extract is evaporated in a vacuum circulating evaporator under nitrogen to dryness. The residue is recrystallized from ethyl acetate. The yield of 16α-methyl-1,4-pregnadiene-14α,17α,21-triol-3,20-dione having a melting point of 236/237–273.5° C. amounts to 3.5 g. which equals 70% of the theoretical. The ultra violet extinction is $$\epsilon_{241} = 15{,}500$$

Example 5

760 mg. of 16α-methyl-1,4-pregnadiene-14α,17α,21-triol-3,20-dione are acetylated under the conditions described in Example 3 and further worked up. After recrystallization from ethyl acetate the 21-acetate is obtained in an amount of 640 mg. = 75% of the theoretical. The compound is 16α-methyl-1,4-pregnadiene-14α,17α,21-triol-3,20-dione-21-acetate having a melting point of 229/229.5–230° C. with an ultra violet extinction of $$\epsilon_{241} = 16{,}200$$

Example 6

A 50 liter capacity stainless steel fermenter is charged with 30 liters of a nutrient solution containing:

|  | Percent |
|---|---|
| Saccharose | 5 |
| Beet sugar molasses | 1 |
| NaHCO₃ | 0.2 |
| KH₂PO₄ | 0.1 |
| KCl | 0.5 |
| MgSO₄ | 0.05 |
| FeSO₄ | 0.001 |
| Cornsteep (pH 7) | 0.5 |

It is sterilized by heating for one half hour at 120° C. and after cooling it is inoculated with a spore suspension of *Curvularia lunata* obtained by rinsing a 7 day maize culture (15 g. maize) with approximately 100 cc. of physiological saline solution.

After 2 days of propagation at 25° C. under stirring (220 revolutions per minute) and airing (1.65 cubic meters per hour) 1.8 liters of the resulting culture are removed under sterile conditions and transferred into a 50 liter fermenter containing 30 liters of a nutrient solution containing:

|  | Percent |
|---|---|
| Saccharose | 5 |
| Beet sugar molasses | 1 |
| NaNO₃ | 0.2 |
| KH₂PO₄ | 0.1 |

After 24 hours of culturing under stirring (110 revolutions per minute) and airing (8 cubic meters per hour) 7.5 g. of 16α-methyl-4-pregnene-21-ol-3,20-dione in 200 cc. of ethanol are added and fermented for 28 hours under the same conditions.

The course of the fermentation is followed by removal of samples which are extracted with methyl isobutyl ketone. The extracts are analyzed by paper chromatography in the system of dioxane+toluene/propylene glycol.

After the end of the fermentation the culture broth is filtered off under suction and extracted with methyl isobutyl ketone. The extract is evaporated under vacuum and the residue is subjected to chromatography on silica gel to separate the 11β- and 14α-hydroxylated compounds. The fraction with 16α-methyl-4-pregnene-14α,21-diol-3,20-dione is acetylated as the crude product.

Example 7

6 g. of the crude product obtained according to Example 6 are allowed to stand in 20 cc. of pyridine with 10 cc. of acetanhydride for 3 hours at room temperature and thereafter stirred into 120 c. of 8% sulfuric acid at 0° C. After 1 hour the crystalline product is filtered off under suction, washed with water, dried and recrystallized from isopropyl ether. There is thus obtained 0.7 g. of 16α-methyl-4-pregnene-14α,21-diol-3,20-dione-21-acetate having a melting point of 193–194° C.

| Analysis | $C_{24}H_{34}O_5$ | | (420.5) |
|---|---|---|---|
| Calculated | 71.7 | 8.5 | 19.9 |
| Found | 70.4 | 9.0 | $20.1\epsilon_{240} = 15{,}200$ |

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended

What is claimed as new and desired to be secured by Letters Patent is:

1. 16α-methyl-corticosterone.
2. A compound of the formula:

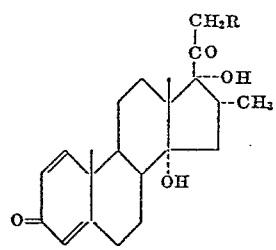

wherein R is an acyloxy group the acyl of which is derived from a lower aliphatic carboxylic acid.

3. A compound of the formula:

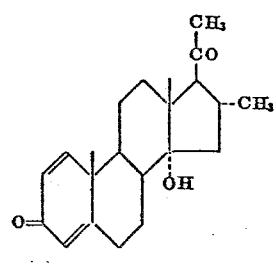

4. 16α-methyl-1,4,pregnadiene-14α,17α,21 - triol - 3,20-dione.

5. 16α-methyl-1,4-pregnadiene-14α,17α,21 - triol - 3,20-dione-21-acetate.

References Cited in the file of this patent
UNITED STATES PATENTS

| | | |
|---|---|---|
| 2,708,673 | Levin et al. | May 17, 1955 |
| 2,844,513 | Wettstein et al. | July 22, 1958 |
| 2,875,132 | McAleer et al. | Feb. 24, 1959 |
| 2,889,346 | Ringold et al. | June 2, 1959 |
| 2,929,813 | Bloom et al. | Mar. 22, 1960 |

OTHER REFERENCES

Fieser et al.: "Steroids" (1956), published by the Reinhold Publishing Corporation, New York, pp. 603–607 relied on.

Arth et al.: "Journal Amer. Chem. Soc.," vol. 80 (1958), pp. 3160 and 3162 relied on.

Fieser et al.: "Steroids" (1959), by Reinhold Publishing Company. Pages 603, 565 relied on.